United States Patent [19]

Beckman et al.

[11] Patent Number: 4,505,561
[45] Date of Patent: Mar. 19, 1985

[54] MULTI-IMAGE CAMERA

[76] Inventors: Leo H. Beckman, Willem de Merodestraat, Delft; Abraham Groeneweg, Dr. Albert Schweitzer Laan 103, 3146 Maassluis, both of Netherlands

[21] Appl. No.: 494,369

[22] Filed: May 13, 1983

[30] Foreign Application Priority Data

May 13, 1982 [DE] Fed. Rep. of Germany ....... 3217938

[51] Int. Cl.³ .............................................. G03B 29/00
[52] U.S. Cl. ..................... 354/123; 355/54; 355/66; 346/110 R
[58] Field of Search .................. 354/75, 76, 120, 123, 354/124; 355/20, 43, 54, 60, 66, 65; 346/110 R

[56] References Cited

U.S. PATENT DOCUMENTS

| | | | |
|---|---|---|---|
| 4,103,310 | 7/1978 | Yasillo | 354/76 |
| 4,191,962 | 3/1980 | Sramek | 354/76 |
| 4,285,587 | 8/1981 | Schiff et al. | 355/66 |
| 4,343,543 | 8/1982 | Schiff et al. | 354/124 |

FOREIGN PATENT DOCUMENTS

| | | | |
|---|---|---|---|
| 2385116 | 11/1978 | France | 354/120 |
| 8102729 | 1/1982 | Netherlands . | |

Primary Examiner—A. A. Mathews

[57] ABSTRACT

An apparatus for transmitting pictures from a screen to pre-determined panels on a film sheet has a film sheet, a screen, two 45° mirrors which are disposed in a ray path between the screen and the film sheet, a lens system which is disposed in the ray path, the optical axis of which is parallel to the film sheet, a moving device along one of the edges of the film sheet for moving the film sheet in an image plane of the film sheet, and additional moving devices for moving the screen, the 45° mirrors and the lens system. The screen is parallel to the image plane of the film sheet. A base is provided which is parallel to the film sheet. A swivel flange is provided coaxial with the central axis of the screen which can be swivelled about the base through at least 180° and which is optically open towards the screen. An extension housing is carried on the base, in which the 45° mirrors together with the lens system are accommodated and which can be swivelled with the base through at least 180° and is optically open towards the film sheet. The optical axis of the extension housing is parallel in the 0° position and in the 180° position. And the length of the optical axis of the extension housing equals approximately half the length of the diagonal of the panels.

17 Claims, 8 Drawing Figures

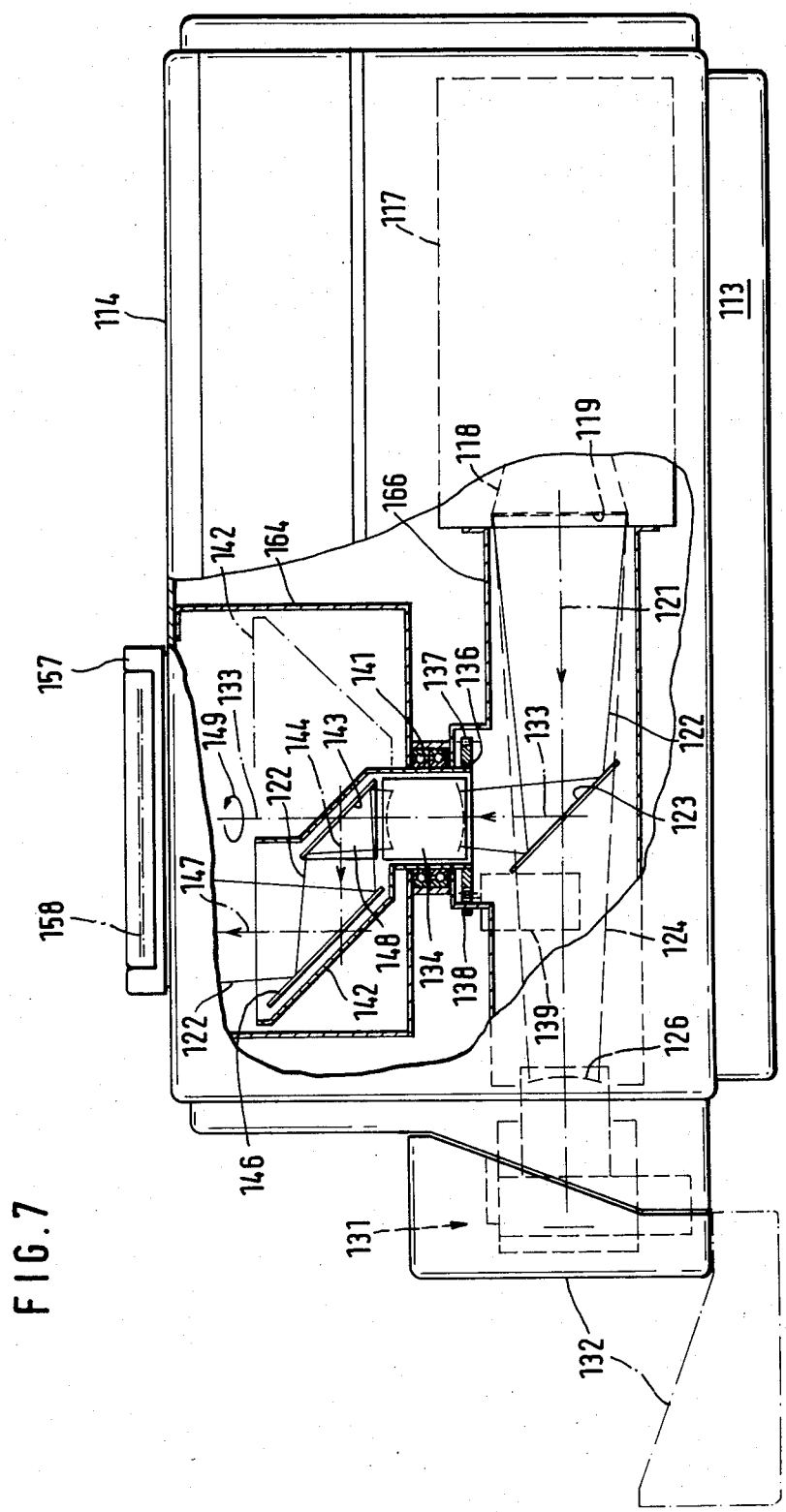

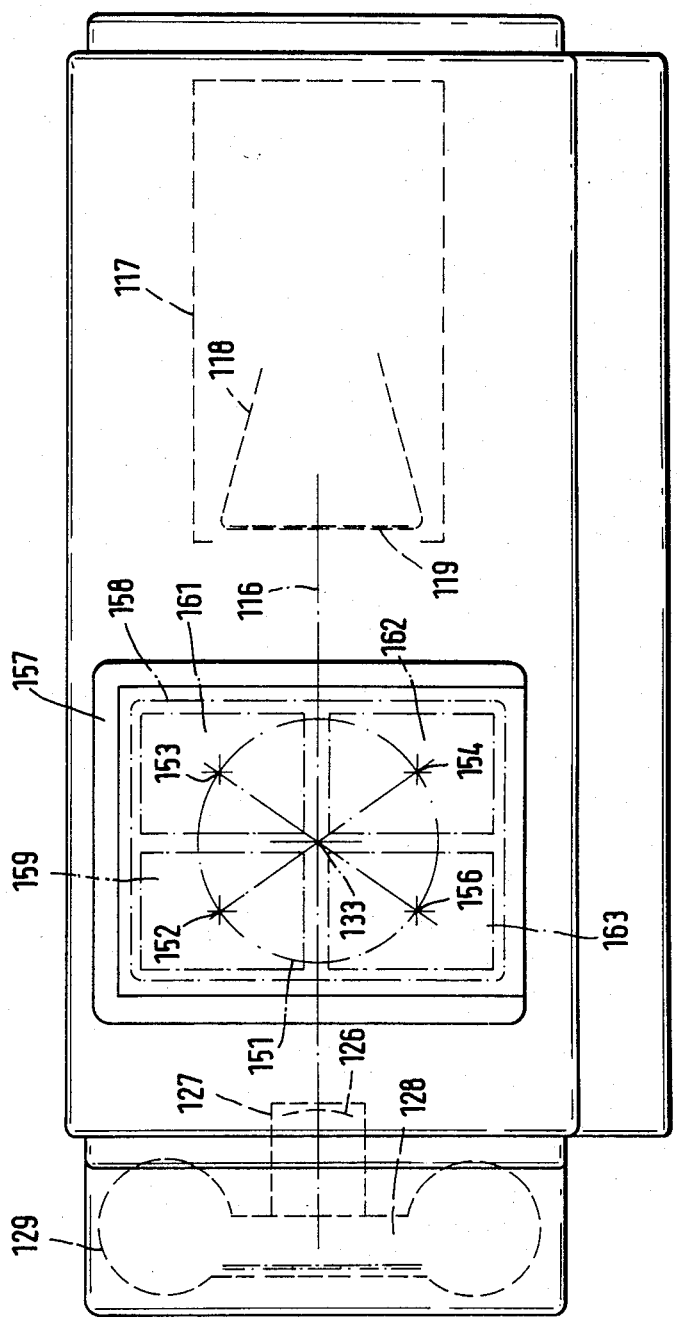

MULTI-IMAGE CAMERA

This invention relates to a multi-image camera, and more particularly to an apparatus for transmitting pictures from a screen to pre-determined panels on a film sheet and said apparatus comprising a film sheet, a screen, two 45° mirrors which are disposed in a ray path between the screen and the film sheet, a lens system which is disposed in the ray path, a moving device along one of the edges of the film sheet for moving the film sheet in an image plane of the film sheet, and additional moving devices for moving the screen, the 45° mirrors and the lens system.

BACKGROUND OF THE INVENTION

Such cameras are used in computer tomography, ultrasonic diagnostics, nuclear-medicine image plotting for the purpose of documentation and recording. Several images from a screen are captured on a film sheet. The film sheet is then developed in a different station.

An apparatus of the kind mentioned at the beginning has become known from the publicly distributed copy of Dutch Application No. 8,102,729. This apparatus has the following disadvantages:

(a) The camera is relatively large in volume because the guide rods for guiding the film sheet carrier and for guiding the monitor, the mirrors and the lens system have to be long. At least 3 mirrors are necessary. This results in a loss of light, since, when new, a mirror has a maximum efficiency of 95% and later it has an efficiency of 90%. After some time, one therefore only obtains an efficiency of 73%.

(b) Relatively large masses of sensitive parts have to be moved. Although the enlargement scale cannot be changed, the entire monitor/mirror/lens system has to be moved. Such unnecessary movements impair however the service life of the screen tube, even if rubber belts are inserted between the drive motors and the highly sensitive parts so as to cushion the starting jerk and the braking jerk. Apart from this, rubber belts produce an abrasion that is detrimental to the optical properties.

(c) Two of the three necessary mirrors are always directed upwardly and are therefore particularly exposed to the risk of dust settling thereon.

(d) To prevent the apparatus from being even larger in construction than it is in any case, it is imperative that the screen tube should be arranged horizontally in the apparatus. This is however an unfavourable position for a moved screen tube.

(e) The construction makes it impossible to photograph the screen in different enlargements.

OBJECT AND STATEMENT OF THE INVENTION

It is the object of the invention to indicate an apparatus which avoids the afore-mentioned disadvantages in a cumulative manner. In particular, a simple construction is to be rendered possible with the aid of the invention. Another aim is the possibility of moving, with the apparatus according to the invention, few parts by the shortest possible distance when the images are being placed on the film sheet.

According to the invention, this problem is solved by the following features:

(a) the screen is parallel to the image plane of the film sheet, (b) a base is provided which is parallel to the film sheet, (c) a swivel flange is provided coaxial with the central axis of the screen which can be swivelled about the base through at least 180 degrees and which is optically open towards the screen, (d) an extension housing is carried on the base, in which the 45 degree mirrors together with the lens system are accomodated and which can be swivelled with the base through at least 180 degrees and is optically open towards the film sheet, (e) the optical axis of the extension housing is parallel in the 0 degree position and in the 180 degree position, and (f) the length of the optical axis of the extension housing equals approximately half the length of the diagonal of the panels.

Advantageously, the invention includes the following additional features: Both the screen and the base each have a separate moving device, by means of which the screen and the base can be moved towards and away from the film sheet. Due to the features even shorter distances of the individual components are ensured.

All the moving devices work numerically and are controlled by a programmable micro-processor. Due to these features one can freely choose the image to be photographed, the size thereof, and the place where photographing is to be effected.

The screen and the base moving devices have electric motors, the stator of which is fixed to the frame of the apparatus and the rotor of which drives a coaxial spindle. Threaded means are provided on the spindles which carry along the base. Due to these features one ensures a quiet, abrasion-free and accurate positioning with a low power requirement and one can use small electric motors.

The electric motors are servo-motors. Due to these features one ensures a reduction in price compared to the stepping motors, which can also be used.

The screen tube is arranged in the holding means with the screen suspended upwardly. Due to these features one obtains positions of the screen tube and the screen which ensure particularly careful treatment and adapt very well to the optical system.

For both the base of the swivel flange and for the holding means, a common rod guiding device is provided, separate from the spindles and vertical to the image plane of the film sheet. Due to these features one obtains an extremely friction-free, stable and space-saving guiding device for the individual components.

Rod guiding device comprises two parallel rods which are arranged closely side by side and pass through carrying lugs on the base and the holding means respectively and, in a side view, are aligned with the central axis of the screen. Due to these features this guiding device is light in relation to its stiffness, is simple in construction, and does not impair the swivel movement of the extension housing.

A gas spring engages in the base of the swivel flange for weight relief. Due to these features the base can be controlled very accurately with a small amount of energy and the spindle is relieved.

The invention will now be described with the aid of a preferred exemplified embodiment. In the drawings:

DESCRIPTION OF THE DRAWINGS

FIG. 7 shows a split lateral view of a table model.

FIG. 8 shows a top view in respect of FIG. 7.

DETAILED DESCRIPTION OF THE INVENTION

Figure 1:
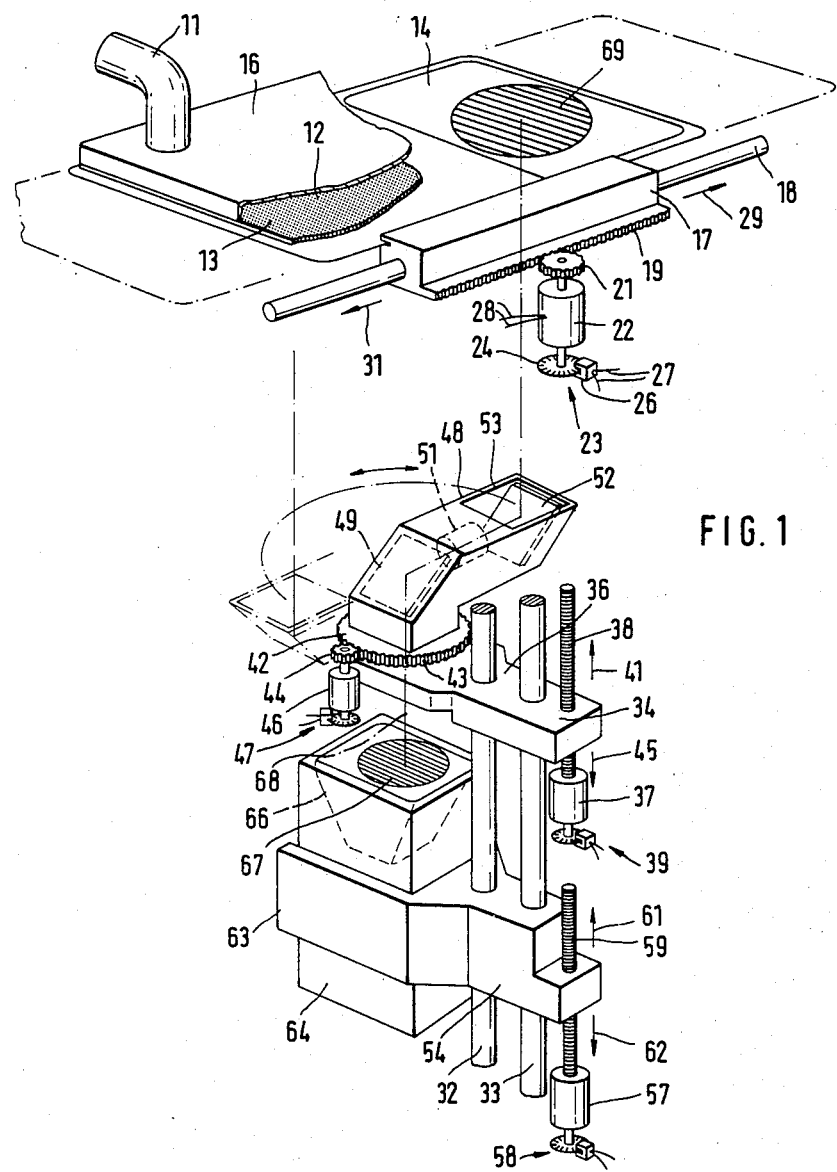
FIG. 1 shows a perspective view of the most important constructional units provided in the apparatus.

As shown in FIG. 1, there is provided a vacuum socket 11 which is communication with the interior 12 of a vacuum plate 16 which, in the downward direction, has a perforated wall 13. To the perforated wall 13 there has been sucked a film sheet 14 which is rectangular in shape. The vacuum plate 16, together with the sucked-on film sheet 14, has been rigidly fastened to a guide section 17 which is approximately rectangular in cross section and has a cylindrical longitudinal bore, through which a circular cylindrical, horizontal guide rod 18 passes, which rod is fixed to the frame with its ends. A rack 19 has been fastened to the guide rod 18 in the same longitudinal direction and parallel to the guide rod 18. This rack is considerably shorter than the length of the film sheet 14. With the rack 19 there meshes a gear 21 which sits directly on the driven shaft of an electric motor 22. The electric motor 22 has been fixed to the frame in a manner not shown. The position of its rotor, and consequently the position of the guide section 17 and thus the position of the film sheet 14, is detected by a pick-up 23 which, in this case, is symbolised by a coding disc 24, whose information contents—symbolically shown by lines—are read by a reader 26 and fed via wires 27 to a micro-processor. The electric motor 22, for its part, is triggered by this micro-processor unit via wires 28 and can rotate to the right or left so that the film sheet 14 moves either according to the arrow 29 or in the opposite direction according to the arrow 31. The movement is purely linear because of the guide rod 18.

As shown in FIG. 1, there are furthermore provided two vertical guide rods 32, 33 which are circular cylindrical, are at a short distance from each other, are vertical to the film sheet 14 and are disposed considerably laterally of the longitudinal center plane of the film sheet 14. The guide rods are rigid in bending. In their upper zones, the guide rods 32, 33 pass, in two circular cylindrical bores, a lug 34 of a base 36. Due to this kind of guide, the base 36 can only be moved up and down. The movement is ensured by an electric motor 37, the driven shaft of which drives an upwardly extending spindle 38. The electric motor 37 is fixed to the frame, that is to say it cannot move up or down. The spindle 38 passes through the lug 34 in a spindle nut. The upper end of the spindle 38 is mounted so as to be fixed to the frame but so as to be rotatable. The electric motor 37 is equipped in the same way as the electric motor 22, that is to say it has a pick-up 39, by means of which it communicates the position of the rotor of the electric motor 37 to the micro-processor unit. The electric motor 37 is moved by the micro-processor unit from a specific actual position to a specific desired position, depending on the program. This renders possible movements in the upward direction as per the arrow 41 or in the downward direction as per the arrow 45. On the inwardly located widening of the base 36 there is mounted a flange 42 so as to be rotatable but immovable otherwise. The flange 42 has teeth 43 along its circumference. These mesh with a driven pinion 44 of a third electric motor 46, the stator of which is rigidly connected to the base 36, in other words can be moved up and down therewith. Furthermore, this electric motor 46 also has a pick-up 47 which communicates the position of the stator, and consequently that of the flange 42, to the micro-processor unit. Furthermore, the electric motor 46 is triggered by the micro-processor unit via wires not shown.

An extension housing 48 is mounted on the flange 42 so as to be secured against rotation. It accommodates in a dust-tight manner a first mirror 49, whose reflecting surface is downwardly directed and which is located above a central opening in the flange 42. Approximately in the centre of the extension housing 48, there is located a lens system 51 which is horizontally arranged optically to the rear of first mirror 49 and is fixedly connected to the extension housing 48. As shown in FIG. 1, there is located, at the rear of the lens system on the right-hand side, another 45° mirror 52, whose reflecting surface is upwardly directed. The electric motor 46 allows the extension housing 48 to move into the 0° position shown in solid lines and into the 180° position shown in dash-dotted lines or it can—counted to the right—sweep over an angle which starts approximately at the 45° position and stops approximately at the 225° position.

Above the 45° mirror, the top of the extension housing 48 is open by means of a window 53.

Beneath the lug 34 there is provided another lug 54. This lug is traversed by the two guide rods 32, 33 and can move up and down thereon. These upward and downward movements are ensured by an electric motor 57 which, in turn, has a pick-up 58 which is connected to the micro-processor unit and indicates the position of the rotor of the electric motor 57 to this unit. Lines not shown pass from the micro-processor unit to the electric motor 57 so as to move this motor to the left or right. There then moves a spindle 59 which is aligned with the spindle 38 and which passes through the lug 54 in a spindle nut not shown. There is thus possible optionally an upward movement according to the arrow 61 or a downward movement according to the arrow 63. The lug 54 merges in a stable fork 63. This fork carries a housing 64. In the housing 64 there is suspended a screen tube 66, whose screen 67 is horizontal and is upwardly directed. Its optical central axis 68 is vertical to the film sheet 14 and parallel to the guide rods 32, 33. The central axis 68 is horizontally deflected by 90° on the mirror 49, then passes through the lens system 51, passes on the mirror 52 and is then projected vertically upwardly so that an image 69 of the screen 67 is formed on the film sheet 14.

Figure 2:
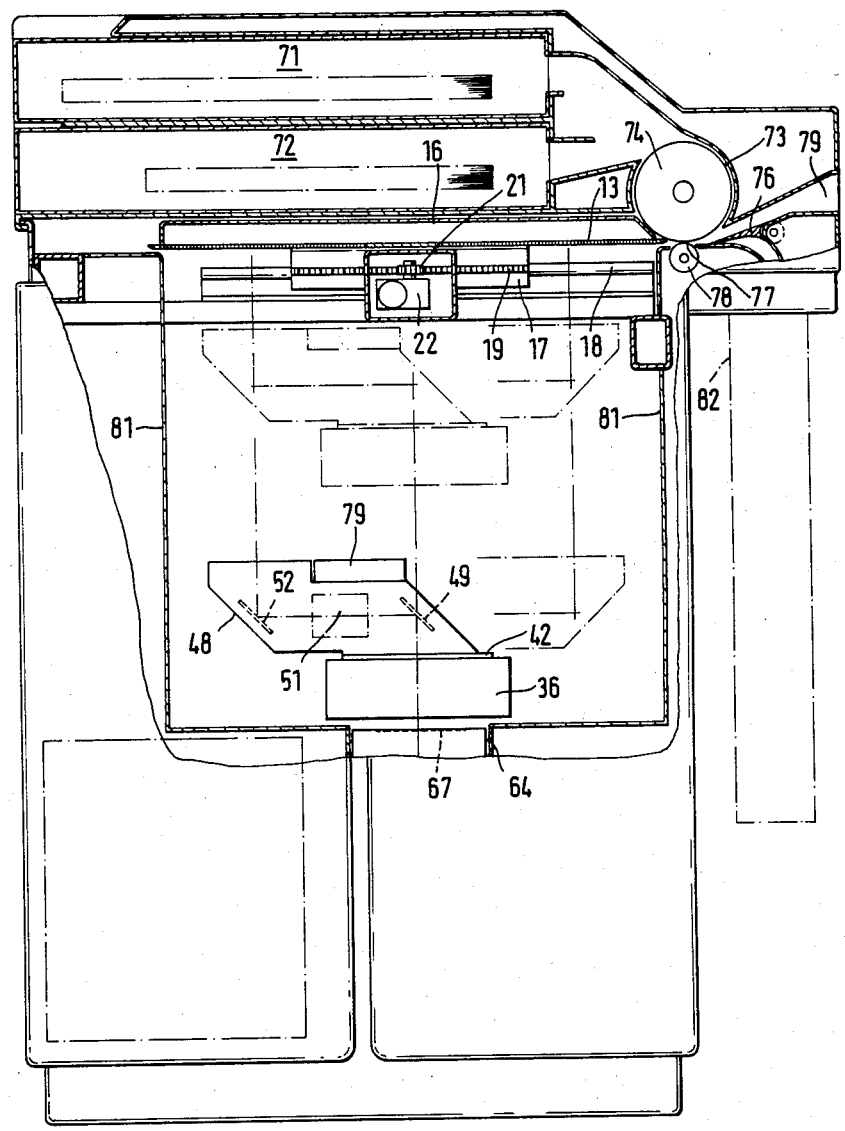
FIG. 2 shows a longitudinal section through the apparatus.
Figure 3:
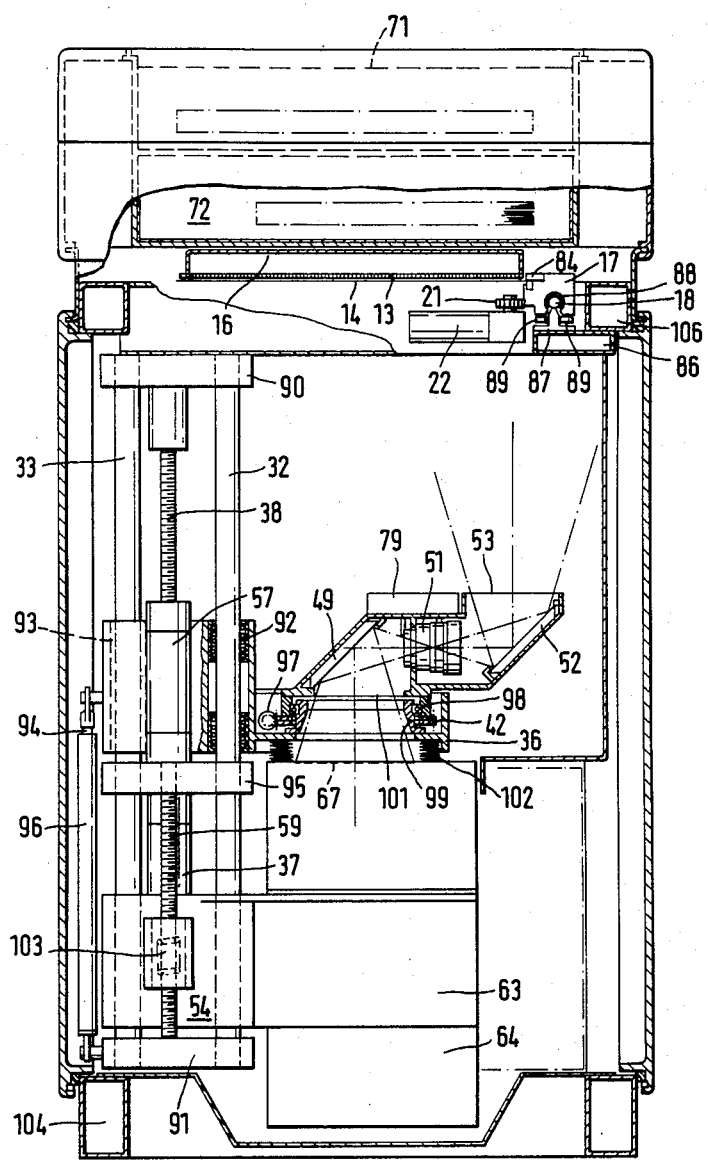
FIG. 3 shows a cross section through the apparatus.

Following this rather schematic explanation, the appraisal of the construction drawings of FIGS. 2 and 3 is facilitated.

In addition to the units shown in FIG. 1 there is provided herein an upper film magazine 71 and a lower film magazine 72. There may be provided therein either film sheets of identical size or film sheets of one size in one and film sheets of the other size in the other. By correctly operating the micro-processor one is in a position to remove film sheets of one size or the other. These are fed by a transporting mechanism not shown to a nip 73, one surface of which is fixed to the frame and the internal surface of which is the circumference of a transporting roller 74. A switch blade 76 ensures that the front edge of a film sheet passes through the gap 77 between the transporting roller 74 and the counter-roller 78. Both push the film sheet beneath the vacuum plate 16, where it is retained on the perforated wall 13, being sucked upwardly. In this case, the vacuum plate 16 is stationary and the guide section 17 is provided, on its surface that is to the rear in FIG. 2, with a gripping device for the longitudinal edge of a film sheet. Following the exposure, the guide section 17 moves again to the right, the transporting roller 74 rotates in the opposite direction and the exposed film sheet leaves the apparatus through a channel 79.

Figure 6:
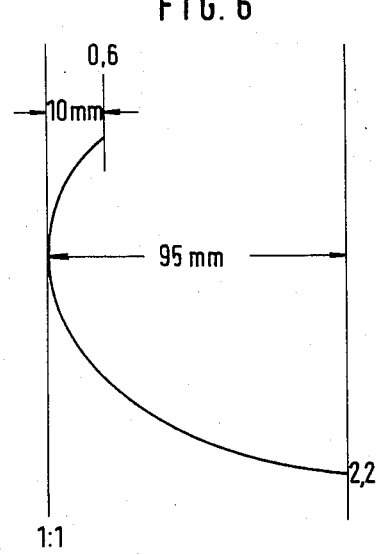
FIG. 6 shows a diagram showing the movement of the monitor as a function of the chosen enlargement.

In FIG. 2, the extension housing 48 is shown in four different positions. The left-hand lower position in solid lines equals the 0° position in a 2.2-fold intensification. The right-hand position shown in dash-dotted lines equals the 180° position with a 2.2-fold enlargement. The position indicated in dash-dotted lines further upwards at the top left equals the 0° position with an 0.6-fold enlargement and the position shown in dash-dotted lines to the right at the same level equals an 0.6-fold intensification and the 180° position. The respective optical axes have been drawn. The box 79 provided on the extension housing 48 accommodates the aperture drive for the lens system 51. Here, the position of the screen 67 equals the 2.2-fold enlargement. As shown in FIG. 6, if the enlargement becomes smaller, the screen 67 is lifted by 95 mm and is then lowered again by 10 mm if an 0.6-fold enlargement is to be attained. The parts above the housing 64 are protectedly housed in a box 81. The switch blade 76 is moved to the top if one does not want to send the exposed film sheets directly to a further processing machine but if it is desired to enter them into a magazine 82 for the time being. In this case, the switch blade 76 is swivelled to the top. When the film sheet 14 is transported out, it never runs back in the nip 73 because of its stiffness.

In FIG. 3, one discerns that a gripping device 84 for the film sheet longitudinal edge has been provided on the guide section 17 on the left-hand top side, that is to say at the rear in the direction of viewing of FIG. 1.

One furthermore sees that a prismatic roller bearing has been used. On a horizontal supporting beam 86 there has been fastened a rail 87 which carries the guide rod 18 at the top. The longitudinal bore 88 is open towards the central rib of the rail 87. In the space between the guide rod 18 and the longitudinal bore 88 there is provided a ball bearing. At the bottom of the guide section 17, on either side of the central rib of the carrying rail 87, there are provided rollers 89 which have a vertical axis of rotation and are inwardly supported on the central rib. One thus obtains an inexpensive highly accurate guide.

As shown in FIG. 3, the guide rods 32, 33 are rigidly connected to each other by a cross bar 90 at the top and by a cross bar 91 at the bottom. Like the spindle 59, the spindle 38 is centrally located between the guide rods 32, 33 in a protected manner. The lug 34 from FIG. 1 comprises herein two guide sleeves 92, 93 which are supported on the guide rods 32, 33 via ball bearings. The piston rod 94 of a gas pressure spring 96, whose lower end is connected to the cross bar 91, engages in the outside of the guide sleeve 93. A little downwards of the lowest position of the guide sleeves 92, 93 there is provided a third cross bar 95 for further stiffening the guide rods 32, 33; it simultaneously serves as one bearing of the spindle 59. The flange 42 is designed as a worm gear herein, which is in two parts and, for the prevention of any clearance, has a certain bias between the two parts. Accordingly, and in contrast to the constructional form shown in FIG. 1, the worm gear is driven by a worm 97. This results in a finer positioning possibility with a substantially larger reduction, since the reduction ratio of such a gearing equals the number of teeth of the worm gear. FIG. 3 also shows that the flange 42 is mounted, via a ball bearing race 98, on an internal ring 99 which forms part of the base 36. The internal ring 99 is open towards the top and bottom and in the upward direction sees, through a hole 101 of corresponding size in the extension housing 48, the 45° mirror 49. On the bottom of the base 36 there is provided a photographic bellows 102, so that the zone above the screen 67 is light-tight. In FIG. 3, one now discerns also the spindle nut 103 in the lug 54. The whole apparatus has a rugged basic frame 104 and a rugged top frame 106 as well as vertically extending frame legs not designated in detail.

Figure 4:
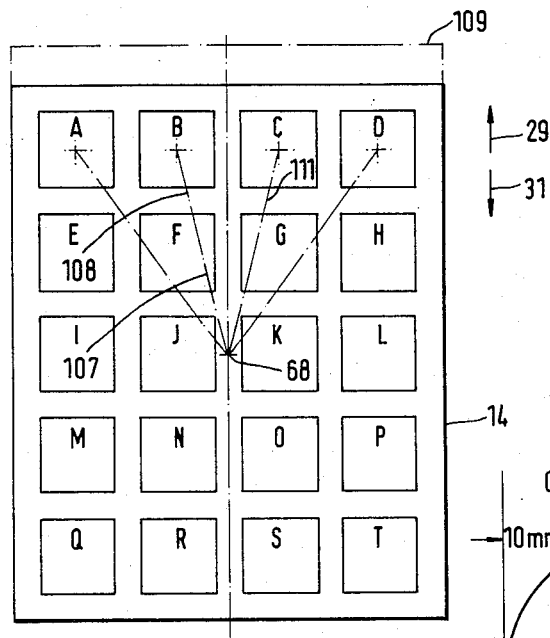
FIG. 4 shows a top view of a first film sheet.

In order to photograph on a film sheet 14 four times 5=20 pictures of identical size, and consequently of the same degree of enlargement, as shown in FIG. 4, the electric motor 37 and the electric motor 57 are brought into the correct position by the micro-processor for setting the correct enlargement. This can be readily programmed, since for a specific enlargement one needs a very specific position of the components taking part in the image formation. One furthermore inputs where the individual pictures are to be arranged. If an arrangement according to FIG. 4 is desired, then, with the geometric ratios shown, the extension housing 48 is moved from its 0° position to the 326° position according to the line 107, which is effected by the electric motor 46 on account of the program. The electric motor 22 moves the film sheet 14 into the position shown in FIG. 4 and the sheet is then exposed. There is formed the picture A. To allow the picture B to be exposed, the extension housing 48 is moved to its 345° position according to the line 108. However, since the swept-over radius remains the same, the film sheet 14 has to be moved into the position shown by the broken line 109. For producing the picture C, the extension housing 48 is moved to its 15° position according to the line 111 and the film sheet 14 remains in its position shown by the line 109. For the picture D, the film sheet 14 is brought, according to the arrow 31, again into the position which it had during the taking of the picture A.

Figure 5:
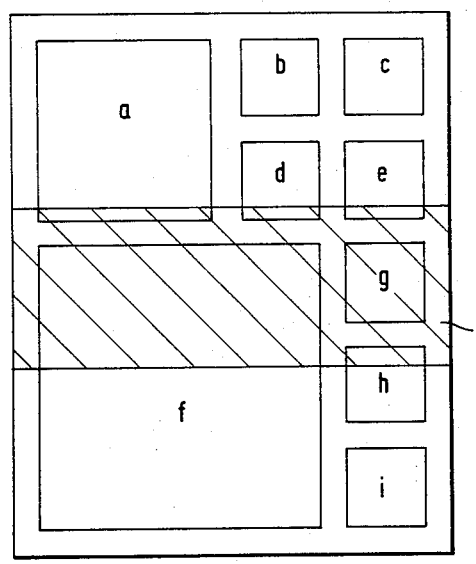
FIG. 5 shows a top view of a second film sheet.

As indicated in FIG. 5, one can also produce pictures according to FIG. 4 in the hatched overlapping zone 112, for which the film sheet 14 was moved far in the direction of the arrow 29 and the extension housing 48 always stays only in the half-plane from 90° to 270°. In this overlap zone 112 one can however also produce pictures for which the film sheet 14 was moved far in the direction of the arrow 29 and the extension housing 48 works in the other half-plane. One will therefore produce the pictures A to H in the easiest manner in such a way that the film sheet 14 is moved substantially in the direction of the arrow 31 and the extension housing 48 works in one half-space, and one will produce the pictures M to T by pushing the film sheet 14 preferably in the direction of the arrow 29 and by allowing the extension housing 48 to swivel in the other half-space.

One can produce the pictures I to L of the central row by moving the film sheet 14 very far in the direction of the arrow 29 and allowing the extension housing 48 to work in a half-plane which is to the right in FIG. 1 or else by moving the film sheet 14 far according to the arrow 31 and by allowing the extension housing 48 to work in the other half-plane.

These movements can be easily programmed since the associated positions of the components are fixed from the outset.

According to FIG. 5, one can also photostat pictures in different enlargements on the same film sheet 14. For this purpose, it is necessary to move the electric motors 37 and 57 separately in accordance with the pre-determined enlargement. Expendiently, one will, with a selection according to FIG. 5, initially photostat the pictures a to e, then swivel the extension housing 48 into the other half-plane and then produce the pictures f to i.

The invention will be furthermore described with the aid of a preferred second exemplified embodiment. In the drawings thereof:

On a pedestal 113, there is disposed a housing 114 in the shape of a rectangular parallelepiped. This housing has a vertical geometrical central plane 116. Symmetrical about this latter there is provided in the right-hand zone a housing 117 which accommodates a picture tube 118, the screen 119 of which is directed to the left. It has an optical central axis 121. Around this axis there is shown a bundle of rays 122 which impinges on a third 45° mirror 123. The 45° mirror causes a bundle of rays 124 coming from the screen 119 to continue to the left because the 45° mirror 123 is permeable by approximately 20%. Optically to the rear of 45° mirror 123, this bundle of rays 124 impinges on a lens 126 of the lens system 127 of a miniature camera 128. Its housing 131 has on both sides indentations 129 for roll film spools. To the left of the miniature camera 128 there is provided a housing lid 132, which is shown in dash-dotted lines in FIG. 7.

Above the vertically upwardly passing central axis 133 of the 45° mirror 123 there is coaxially provided a lens system 134, which is however axially immovable. Its task is equivalent to that of the lens system 51. The lens system 134 is coaxially surrounded by a flange 136 which has teeth on the outside, which are driven by a driven pinion 138 of an electric motor 139. The electric motor 139 is fixed to the frame. Coaxially with the central axis 133 there is provided a ball bearing 141 which carries an extension housing 142 so that it is rotatable about the central axis 133. A first 45° mirror 143 is centrally traversed by the central axis 133 and directs the bundle of rays 122 with its central axis 144 horizontally to a second 45° mirror 146 which directs the bundle of rays 122 with its central axis 147 vertically to the top. To the left of the first 45° mirror 143 there is located a prism 148 which is optically to the rear of the first mirror 143 shortens the ray path. The extension housing 142 is rotatable according to the ring-shaped arrow 149 so that the central axis 147 runs on the circle 151. The electric motor 139 can be stopped by means not shown so that the central axis 147 stands still at the crosses 152, 153, 154, 156, as shown in FIG. 8. Centrally to the central axis 147 there is provided on the top of the housing 114 a film sheet carrier 157, into which a film sheet 158 can be inserted in a light-tight manner. Depending on the position of the extension housing 143, there are then successively projected on this sheet the pictures 159, 161, 162, 163 in the positions which can be seen in FIG. 8.

As one can establish by measuring the 1:4 representations of FIGS. 7 and 8, this apparatus is very small in construction and nevertheless one is in a position to project four pictures 159 to 163. However, the size thereof cannot be changed and the sequence is also fixed. The apparatus has very few movable parts. Due to small-volume sheathings 164,166, it is easy to keep away the incidence of extraneous light and dust. In addition, it is possible optionally to provide a miniature camera without virtually any additional expenditure of space. As FIG. 8 reveals, the apparatus is very narrow in construction.

We claim:

1. In an apparatus for transmitting pictures from a screen to pre-determined panels on a film sheet, said apparatus comprising
   a film sheet,
   a screen,
   first and second mirrors which are oriented at an angle of 45° from verticle, and disposed in a ray path between the screen and the film sheet,
   a lens system which is disposed in the ray path, the optical axis of which is parrellel to the film sheet,
   a moving device along one of the edges of the film sheet for moving the film sheet in an image plane of the film sheet,
   and additional moving devices for moving the screen, the first and second 45° mirrors and the lens system,
   the improvement wherein:
   (a) the screen is parallel to the image plane of the film sheet,
   (b) a base is provided which is parallel to the film sheet,
   (c) a swivel flange is provided coaxial with the central axis of the screen which can be swivelled about the base through at least 180° and which is optically open towards the screen,
   (d) an extension housing is carried on the swivel flange, in which the first and second 45° mirors together with the lens system are accommodated and which can be swivelled with the swivel flange through at least 180° and is optically open towards the film sheet,
   (e) the optical axis of the extension housing is parallel in the 0° position and in the 180° position, and
   (f) the length of the optical axis of the extension housing equals approximately half the length of the diagonal of the panels.

2. An apparatus as claimed in claim 1, wherein both the screen and the base each have a separate moving device, by means of which the screen and the base can be moved towards and away from the film sheet.

3. An apparatus as claimed in claim 1 or 2, wherein all the moving devices work numerically and are controlled by a programmable micro-processor.

4. An apparatus as claimed in claim 2, wherein the apparatus is mounted to a frame and the screen and the base moving devices have electric motors, the stator of which is fixed to the frame of the apparatus and the rotor of which drives a coaxial spindle, and threaded means are provided on the spindles which carry along a holding means which holds a screen tube, and carry along the base.

5. An apparatus as claimed in claim 4, wherein the electric motors are servo-motors.

6. An apparatus as claimed in claim 4, wherein the screen tube is arranged in the holding means, with the screen suspended upwardly.

7. An apparatus as claimed in claim 4 wherein the film sheet has an image plane, wherein a common rod guiding device is provided for both the base and for the holding means and, the common rod guiding device is separate from the spindles and vertical to the image plane of the film sheet.

8. An apparatus as claimed in claim 7, wherein the common rod guiding device comprises two parallel rods which are arranged closely side by side and pass through carrying lugs on the base and the holding means respectively and are lined up with the central axis of the screen.

9. An apparatus as claimed in claim 1, wherein the lens system is arranged optically to the rear of the first 45° mirror.

10. An apparatus as claimed in claim 9, the lens system is stationary.

11. An apparatus as claimed in claims 9 or 10, wherein the lens system is secured at the level of the swivel flange and inside the flange.

12. An apparatus as claimed in claims 9 or 10, wherein beneath the lens system and the swivel flange there is provided a third mirror oriented at an angle of 45° from verticle which is arranged at the same level as the screen and arranged so that rays from the screen impinge on the third 45° mirror.

13. An apparatus as claimed in claim 12 wherein the third 45° mirror and the screen are immovable.

14. An apparatus as claimed in claim 9 wherein optically to the rear of the first 45° mirror there is provided a prism.

15. As apparatus as claimed in claim 13 wherein the third 45° mirror is partially transmitting and along the optical axis of the screen and optically to the rear of the third 45° mirror there is provided the lens of a minature camera.

16. An apparatus as claimed in claim 1, wherein the swivel flange can be located in position in four angularly offset bearings, corresponding to four pictures of identical size and which are all arranged as a rectangle.

17. An apparatus as claimed in claim 1, wherein one of the first and second 45° mirrors extends considerably higher than the other 45° mirror.

* * * * *